July 7, 1953

L. F. UPDEGROVE 2,644,266

FISHING LINE SINKER

Filed July 18, 1952

INVENTOR.
LAWRENCE F UPDEGROVE,
BY
McMorrow, Berman + Davidson
ATTORNEYS.

Patented July 7, 1953

2,644,266

UNITED STATES PATENT OFFICE 2,644,266

FISHING LINE SINKER

Lawrence F. Updegrove, Alice, Tex.

Application July 18, 1952, Serial No. 299,669

1 Claim. (Cl. 43—44.96)

This invention relates to sinkers for fishing lines and more particularly to a sinker which also serves as an anchor to hold the end of the line attached thereto in place when the line is being used in rough or rapidly moving water, as in surf fishing.

It is among the objects of the invention to provide an improved fishing line sinker which can be secured to a fishing line for use as a weight in casting; which has a flat face and blade formations extending along the edges of the flat face and adapted to dig into loose sand along a shore or beach so that the sinker functions as an anchor to hold an associated fishing line in place against the action of rough or rapidly moving water, as in surf fishing; which is firmly engaged in the sand by the pull of the associated fishing line thereon; which can be made in various weights for use with fishing equipment of varying strengths and sizes; and which is simple and durable in construction, economical to manufacture, positive and effective in operation, and neat and attractive in appearance.

Other objects and advantages will become apparent from a consideration of the following description and the appended claims in conjunction with the accompanying drawing, wherein:

Figure 1:
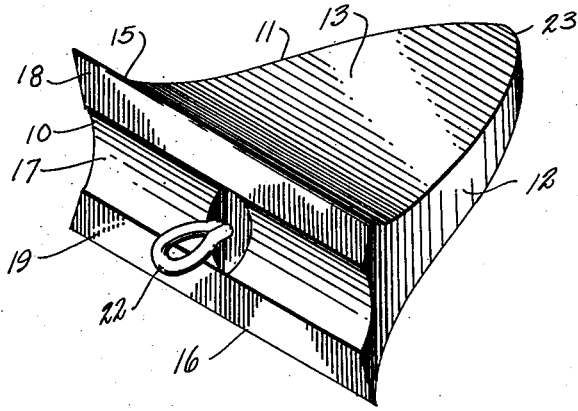
Figure 1 is a perspective view of a fishing line sinker illustrative of the invention.
Figure 2:
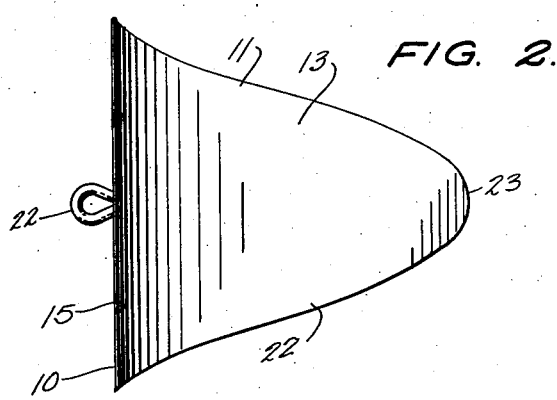
Figure 2 is a top plan view of the sinker illustrated in Figure 1.

With continued reference to the drawing, the sinker comprises a body of heavy, non-buoyant material, such as lead, of flattened, substantially triangular shape having a base end 10 and side surfaces 11 and 12 extending in the same direction one from each end of the base end or surface 10 of the body and converging symmetrically in a direction away from the base. The sides 11 and 12 of the body preferably have a slight reverse or ogee curvature so that the portions thereof adjacent the ends of the base 10 are concavely curved and the portions thereof adjacent the end of the body remote from the base are convexly curved and the end of the body remote from the base is convexly rounded.

The body tapers in thickness in a direction away from the base end 10 thereof and has two faces 13 and 14 which are concavely curved adjacent the base end or surface 10 of the body for a purpose to be later described in detail.

Figure 3:
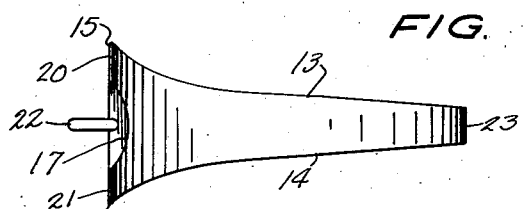
Figure 3 is a side elevational view of the sinker.

The base end surface 10 of the body is of elongated, rectangular cross sectional shape having straight and substantially parallel side edges 15 and 16 and is transversely concave, preferably being provided immediate its width with a shallow groove 17 disposed symmetrically of the width of the base end surface 10 and having flat areas 18 and 19 disposed between the edges 15 and 16 respectively and the respectively adjacent sides of the groove 17, the areas 18 and 19 being disposed substantially in a common plane, as illustrated in Figure 3.

The flat areas 18 and 19 extend outwardly from the corresponding edges of the groove 17 to the side edges 15 and 16 of the base end 10 of the body and the faces 13 and 14 of the body extend from the side edges 15 and 16 respectively to the apical end of the substantially triangular body. The concave curvature of the faces 13 and 14 adjacent the side edges 15 and 16 provides a construction wherein the portions of the body adjacent the side edges 15 and 16 project substantially laterally outward to provide blade formations 20 and 21 which taper in thickness across the thickness of the body from the face surfaces 13 and 14 to an acute condition along the side edges 15 and 16 of the base end of the body.

A line attaching eye 22 is secured in the body and projects from the body substantially at the center of the surface of the base end 10 of the body.

The length of the base end of the body is preferably substantially as great as the width of the body from the base end 10 to the apical end 23 thereof and the width of the base end 10 is materially less than the length of the base end, preferably being less than one-half the length of the base end so that the body will not roll when lying on the sand and subjected to the action of moving water.

Figure 4:
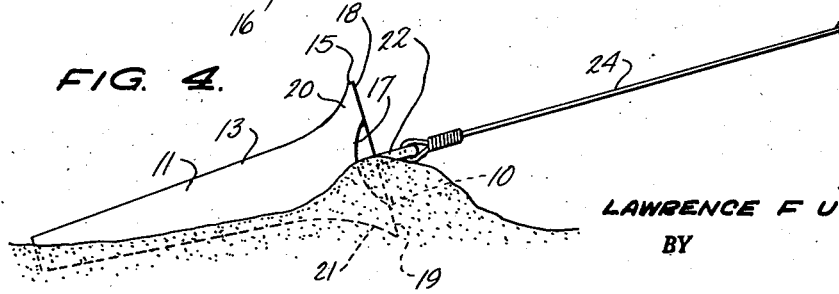
Figure 4 is a somewhat diagrammatic side elevational view of the sinker shown in operative position with a fishing line attached thereto.

In the use of the sinker, the sinker is attached by means of the line attaching eye 22 to one end of a fishing line, as indicated at 24 in Figure 4, and is cast by a suitable casting rod, such as a surf casting rod. After the sinker has been cast out into the water, the line 24 is reeled in sufficiently to move the sinker so that the base end 10 thereof faces the rod from which the line extends and so that the lower blade formation of the sinker digs into the sand on which the sinker rests, as illustrated in Figure 4. Upon further slight forward movement, the sinker will partially bury itself in the sand and will remain in position regardless of the action of the water thereon holding the end of the fishing line attached thereto against substantial movement by the moving water.

It is contemplated that the sinker will be made available in different sizes, such as three ounce, five ounce and six ounce sinkers for use with casting equipment of different weights and strengths and that the sinkers will all have substantially the same shape and proportion regardless of the weight thereof.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A fishing line sinker comprising a body of substantially triangular shape having a base end which is of elongated rectangular shape with a shallow groove extending longitudinally and symmetrically of the width thereof and flat areas disposed between the opposite edges of said groove and the corresponding side edges of said base, said body having top and bottom faces which are concavely curved in a direction away from the corresponding side edges of said base end so that the portions of said body adjacent said side edges project substantially laterally from the remainder of the body and constitute blade formations tapering in thickness transversely of the thickness of said body to an acute condition along the corresponding side edges of said base end, and a line attaching eye projecting from said body substantially at the center of the base end thereof.

LAWRENCE F. UPDEGROVE.

References Cited in the file of this patent

UNITED STATES PATENTS

| Number | Name | Date |
|---|---|---|
| D. 162,874 | Polenz | Apr. 10, 1951 |
| 809,626 | McLaughlin | Jan. 9, 1906 |
| 2,033,683 | Clark | Mar. 10, 1936 |
| 2,256,768 | Taylor | Sept. 23, 1941 |
| 2,611,988 | Gibson | Sept. 30, 1952 |